US008379734B2

(12) United States Patent
Teng et al.

(10) Patent No.: US 8,379,734 B2
(45) Date of Patent: Feb. 19, 2013

(54) METHODS OF PERFORMING ERROR CONCEALMENT FOR DIGITAL VIDEO

(75) Inventors: Chia-Yuan Teng, San Diego, CA (US); Sharath Manjunath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1487 days.

(21) Appl. No.: 11/690,132

(22) Filed: Mar. 23, 2007

(65) Prior Publication Data

US 2008/0232478 A1      Sep. 25, 2008

(51) Int. Cl.
*H04N 7/68* (2006.01)

(52) U.S. Cl. ......... 375/240.27; 375/240.26; 375/240.28; 375/240.03; 375/240.16; 348/700; 382/236; 382/239

(58) Field of Classification Search .................. 375/240.01–240.16, 240.28, 240.26, 240.27; 348/700; 382/236, 238–239
See application file for complete search history.

(56) References Cited

U.S. PATENT DOCUMENTS

| 6,917,651 | B1 * | 7/2005 | Yoo et al. | 375/240.24 |
| 2001/0031006 | A1 * | 10/2001 | Wang et al. | 375/240.16 |

(Continued)

FOREIGN PATENT DOCUMENTS

| JP | 2002247588 | 8/2002 |
| JP | 2005503722 | 2/2005 |

(Continued)

OTHER PUBLICATIONS

Cavusoglu, B. ; Schonfeld, D. ; Ansari, R. ; Bal, D.K. , Real-time low-complexity adaptive approach for enhanced QoS and error resilience in MPEG-2 video transport over RTP networks, Dec. 2005, IEEE, vol. 15 , Issue: 12 , pp. 1604-1614.*

(Continued)

*Primary Examiner* — Andrew L Nalven
*Assistant Examiner* — Amir Mehrmanesh
(74) *Attorney, Agent, or Firm* — Todd E. Marlette; Brent A. Boyd

(57) ABSTRACT

Error concealment is used to hide the effects of errors detected within digital video information. A complex error concealment mode decision is disclosed to determine whether spatial error concealment (SEC) or temporal error concealment (TEC) should be used. The error concealment mode decision system uses different methods depending on whether the damaged frame is an intra-frame or an inter-frame. If the video frame is an intra-frame then a similarity metric is used to determine if the intra-frame represents a scene-change or not. If the video frame is an intra-frame, a complex multi-termed equation is used to determine whether SEC or TEC should be used. A novel spatial error concealment technique is disclosed for use when the error concealment mode decision determines that spatial error concealment should be used for reconstruction. The novel spatial error concealment technique divides a corrupt macroblock into four different regions, a corner region, a row adjacent to the corner region, a column adjacent to the corner region, and a remainder main region. Those regions are then reconstructed in that order and information from earlier reconstructed regions may be used in later reconstructed regions. Finally, a macroblock refreshment technique is disclosed for preventing error propagation from harming non-corrupt inter-blocks. Specifically, an inter-macroblock may be 'refreshed' using spatial error concealment if there has been significant error caused damage that may cause the inter-block to propagate the errors.

19 Claims, 9 Drawing Sheets

U.S. PATENT DOCUMENTS

| | | | |
|---|---|---|---|
| 2002/0027616 A1 | 3/2002 | Jun et al. | |
| 2004/0125877 A1* | 7/2004 | Chang et al. | 375/240.28 |
| 2006/0133480 A1* | 6/2006 | Chang et al. | 375/240.03 |
| 2006/0251177 A1* | 11/2006 | Webb | 375/240.27 |
| 2007/0027616 A1 | 2/2007 | Masson | |
| 2008/0152003 A1* | 6/2008 | Oguz | 375/240.12 |

FOREIGN PATENT DOCUMENTS

WO     WO03026232 A1     3/2003

OTHER PUBLICATIONS

Yen et al.,"Fast gradual effect scene change detection algorithm in MPEG domain", Jan. 31, 2001.

International Search Report—PCT/US08/057890—International Search Authority, European Patent Office—Sep. 17, 2008.

Written Opinion—PCT/US08/057890—International Search Authority, European Patent Office—Sep. 17, 2008.

Pei, S.C. et al., "Novel Error Concealment Method With Adaptive Predication to the Abrupt and Gradual Scene Changes," IEEE Transactions on Multimedia, IEEE Service Center, Piscataway, NJ, vol. 6, No. 1, Feb. 1, 2004, pp. 158-173.

Kaiser S., et al., "Comparison of error concealment techniques for an MPEG-2 video decoder in terrestrial TV-broadcasting<1>," Signal Processing. Image Communication, Elsevier Science Publishers, Amsterdam, NL, vol. 14, No. 6-8, May 1, 1999, pp. 655-676.

Jin-Hau Kuo, et al., "A hybrid semantic scene-based error resilient system," Communication Systems, 2002. ICCS 2002. The 8th International Conference on Nov. 25-28, 2002, Piscataway, NJ, IEEE, vol. 2, Nov. 25, 2002, pp. 973-976.

Kwon, et al., "Overview of H.264/MPEG-4 part 10," Journal of Visual Communication and Image Representation, Academic Press, Inc., vol. 17, No. 2, Apr. 1, 2006, pp. 186-216.

Byeungwoo Jeon et al., "Blocking Artifacts Reduction in Image Compression with Block Boundry Discontiunity Criterion", IEE Transactions on Circuits and Systems for Video Technology, IEEE Service Center, Piscataway, NJ, US, vol. 8, No. 3, Jun. 1, 1998, XP011014468.

El-Sharkawi M A et al. ,"Recovery of Image Blocks Using the Method of Alternating Projections", IEEE Transactions on Image Processing, IEEE Service Center, Piscataway, NJ, US, vol. 14, No. 4, Apr. 1, 2005, pp. 461-474, XP011128566.

European Search Report—EP12001099 Search Authority—Munich Patent Office, Apr. 4, 2012.

European Search Report—EP12001100 Search Authority—Munich Patent Office, Mar. 4, 2012.

Taiwan Search Report—TW097110293—TIPO—Jun. 28, 2011.

\* cited by examiner

METHODS OF PERFORMING ERROR CONCEALMENT FOR DIGITAL VIDEO

FIELD OF THE INVENTION

The present invention relates to the field of digital video decoding and display. In particular the present invention discloses techniques for concealing errors in digital video caused by damaged or lost digital video information.

BACKGROUND OF THE INVENTION

There has been a wireless electronics revolution in recent years due to the rapid advancements and adoption of many new digital wireless communication protocols. For example, Code Division Multiple Access (CDMA) and Global System for Mobile communication (GSM) have greatly increased the popularity of digital cellular telephones, Wi-Fi local area network (LAN) protocols (such as 802.11b, 802.11g, 802.11a, etc.) have revolutionized wireless computer networks, and Bluetooth has provided a very useful short range wireless digital protocol for many different digital devices.

Although these new digital wireless protocols are designed to be resistant to errors, digital wireless communication is always subject to information loss due to various physical effects on the wireless signals. For example, radio interference, errors caused by multi-path reflections, radio signal shielding, range limitations, and other problems can degrade transmitted wireless signals such that information becomes lost.

Non real-time communication applications that use digital wireless protocols can easily handle the loss of information due to any of these reasons by simply requesting the retransmission of the lost information. However, real-time communication applications need to be robust enough to handle the occasional loss or corruption of information that is transmitted across a digital wireless channel.

One specific real-time communication application is the reception and immediate display of digital video information transmitted across a wireless digital communication channel. When some information is lost during the transmission of the digital video, there is not enough time to request and receive a retransmission of the lost information since retransmission brings significant delay which is not suitable for real-time applications such as video telephony and video streaming. Thus, when digital video information is lost, the digital video receiver must attempt to display one ore more video frames using the received incomplete digital video information.

Several different techniques have been developed for decoding and displaying digital video frames as best as possible despite the loss of some digital video information. These techniques developed for displaying incomplete digital video information in the best possible manner are generally referred to as Error Concealment (EC) techniques since these techniques attempt to conceal the lack of accurate video information caused by errors.

The existing techniques of digital video Error Concealment (EC) mainly fall into the following two categories: Temporal Error Concealment (TEC) and Spatial Error Concealment (SEC). Temporal Error Concealment (TEC) exploits temporal correlation between nearby (in a time dimension) video frames. TEC conceals errors by replacing corrupt macroblocks (MBs) with the processed macroblocks from previously reconstructed video frames. On the other hand, Spatial Error Concealment (SEC) exploits spatial correlation within a single video frame. Spatial Error Concealment conceals errors by predicting the erroneous pixels from neighboring pixels (or transform coefficients).

Block Replacement Error Concealment (BREC) is the simplest and the most straightforward type of Temporal Error Concealment (TEC). Block replacement error concealment conceals errors by replacing erroneous macroblocks with the co-located macroblocks from a previously reconstructed video frame. This simple approach to temporal error concealment assumes a zero motion vector for the erroneous macroblocks to be concealed. The performance may be improved by utilizing more accurate motion vectors rather than a zero motion vector. Motion Vector Processing (MVP) is such an example.

A very simple Spatial Error Concealment (SEC) implementation may just replace erroneous pixels with information from the nearest available pixels. Improvement can be achieved by utilizing interpolation and spatial prediction. The Spatial Error Concealment (SEC) may be performed either in the pixel domain or in the frequency domain.

In order to provide the best looking video to user when errors in the communication stream occur, the digital video receiver should select the optimum error concealment system. Thus, it would be desirable to create digital video receivers that carefully select the best error concealment system and then implement the error concealment systems in manners that display the best possible video image from the incomplete digital video information.

SUMMARY OF THE INVENTION

The present invention introduces methods for performing error concealment when errors are detected within digital video information. A number of different techniques are presented in order to perform very high quality digital video error concealment.

A first technique disclosed is a very sophisticated method of determining whether spatial error concealment (SEC) or temporal error concealment (TEC) should be used. The main technique is to determine whether a scene change has occurred and when a scene change has occurred then spatial error concealment will be used (unless there are too many errors to perform spatial error concealment). The error concealment mode decision system uses different methods depending on whether the damaged frame is an intra-frame or an inter-frame. If the video frame is an intra-frame then a similarity metric is used to determine if the intra-frame represents a scene-change or not. If the video frame is an intra-frame, a complex multi-termed equation is used to determine whether SEC or TEC should be used.

A novel spatial error concealment technique is disclosed for use when the error concealment mode decision determines that spatial error concealment should be used for reconstruction. The novel spatial error concealment technique divides a corrupt macroblock into four different regions, a corner region, a row adjacent to the corner region, a column adjacent to the corner region, and a remainder main region. The corner region is reconstructed first using adjacent macroblocks. The column and row regions are reconstructed next by using adjacent macroblocks or the reconstructed corner region in addition to adjacent macroblocks. Finally, the remainder region is interpolated using adjacent macroblocks, the column region, the row region, and the corner region.

Finally, a macroblock refreshment technique is disclosed for preventing error propagation from harming non-corrupt inter-blocks. Specifically, an inter-macroblock may be 'refreshed' using spatial error concealment if there has been significant error caused damage that may cause the inter-block to propagate the errors. To determine when an inter-macroblock should be refreshed, a damage calculation is performed. The damage calculation considers the number of corrupt macroblocks, the amount of motion, whether a scene change has occurred, and a number of non corrupt intra-macroblocks.

Other objects, features, and advantages of present invention will be apparent from the accompanying drawings and from the following detailed description.

BRIEF DESCRIPTION OF THE DRAWINGS

The objects, features, and advantages of the present invention will be apparent to one skilled in the art, in view of the following detailed description in which.

DETAILED DESCRIPTION

Figure 1:
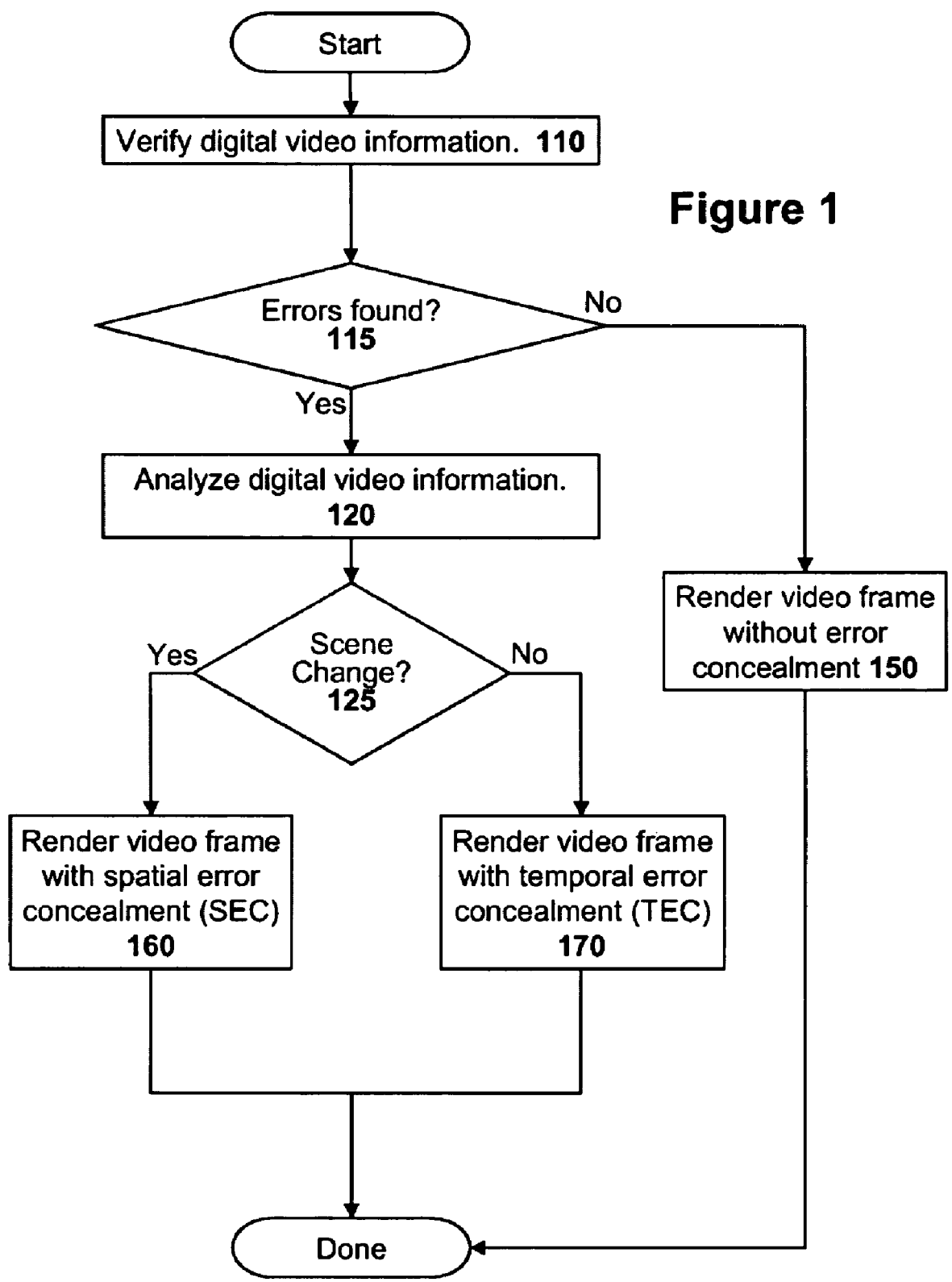
FIG. 1 illustrates the general flow of making a scene-change based error concealment mode decision in a digital video receiver/decoder.

Methods of selecting and implementing error concealment systems for digital video are disclosed. In the following description, for purposes of explanation, specific nomenclature is set forth to provide a thorough understanding of the present invention. However, it will be apparent to one skilled in the art that these specific details are not required in order to practice the present invention. Furthermore, although the present invention is mainly described with reference to the MPEG digital video encoding protocols, the same techniques can easily be applied to other types of digital video encoding protocols.

Error Concealment Mode Selection Overview

As set forth in the background, a digital video receiver/decoder that receives a disrupted digital video stream with incomplete digital video information must display a video image as best it can without the lost information. The digital video receiver/decoder cannot request the retransmission of lost information since retransmission brings significant delay which is not suitable for real-time applications such as video telephony and video streaming. Thus, several techniques have been developed for displaying digital video information as best as possible despite the loss or corruption of some of the digital video information. These techniques for displaying incomplete digital video information in the best possible manner are generally referred to as Error Concealment (EC) techniques.

Various different error concealment techniques exist for reconstructing and displaying digital video frames damaged during transmission. The two main categories of error concealment are Temporal Error Concealment (TEC) and Spatial Error Concealment (SEC). Temporal Error Concealment (TEC) exploits temporal correlation between nearby (in a time dimension) digital video frames. Temporal error concealment often conceals errors by replacing corrupted macroblocks (MBs) with processed macroblocks from previously reconstructed video frames. Spatial Error Concealment (SEC) exploits spatial correlation within a single video frame. Spatial error concealment conceals digital video frame errors by predicting the erroneous pixels from neighboring pixels (or transform coefficients).

Each different error concealment technique has its own advantages and disadvantages. Thus, whether temporal error concealment or spatial error concealment will provide the best results will depend on the current circumstances. The determination of whether to use temporal error concealment (TEC) or spatial error concealment (SEC) is known as the Error Concealment (EC) mode decision. The optimal solution to the error concealment mode decision is to select the error concealment method that minimizes a given distortion metric. For example, $$Do \begin{cases} SEC, & \text{if } D_{TEC} < D_{SEC} \\ TEC, & \text{if } D_{SEC} < D_{TEC} \end{cases}$$

wherein $D_{SEC}$ is the distortion between SEC-concealed frames and reference frames and $D_{TEC}$ is the distortion between TEC-concealed frames and reference frames.

However, in practice, it is very difficult to measure the distortion because a reference is generally not available. Thus, other methods must be used to determine whether a digital video receiver/decoder should use spatial error concealment or temporal error concealment.

Error Concealment Mode Based On Scene-Change

A typical video sequence consists of a significant percentage of highly temporally correlated video frames and periodic "scene-change" video frames that are not well temporally correlated to earlier video frames. Thus, since most video frames are highly temporally correlated, temporal error concealment systems will outperform spatial error concealment systems in most circumstances. However, for a scene-change video frame wherein the video frame contains a new scene that is not well correlated to earlier digital video frames, temporal based error concealment systems generally provide unsatisfactory results since the similarity between video frames is low. Thus, spatial error concealment is generally a better choice for error concealment when a scene-change occurs.

FIG. 1 illustrates the general flow of making a scene-change based error concealment mode decision in a digital video receiver/decoder. At step 110 the digital video receiver/decoder verifies the digital video information for the video frame. If no errors are found in the digital video information at step 115, then the digital video receiver/decoder can render the video frame without any help from error concealment methods as set forth in step 150.

If errors in the digital video frame information are found, the digital video receiver/decoder then analyzes the digital video frame information at step 120 to attempt to determine if the damaged video frame represents a scene-change frame. If the digital video receiver/decoder determines that a scene-change has occurred at step 125, then the video frame is reconstructed with the aid of a spatial error concealment technique as set forth in step 160. Otherwise, when the system has determined that a scene-change has not occurred, the damaged video frame is reconstructed with the help of a temporal error concealment technique as set forth in step 170.

One of the most difficult aspects of the error concealment system disclosed in FIG. 1 is the analysis of the damaged digital video frame information in order to make a decision as to whether a scene-change occurred as set forth in steps 120 and 125. Specifically, how can a digital video receiver/decoder accurately determine when a scene-change has occurred?

One simplistic method of implementing a scene-change error concealment mode decision is to simply select the error concealment technique based on the type of video frame that is being decoded. Specifically, a very simple scene-change based error concealment mode decision method may select spatial error concealment (SEC) for all Intra-frames (I-frames) and select temporal error concealment (TEC) for all non Intra-frames (the P-frames and the B-frames). This very simple approach is based upon the assumption that the digital video encoder encodes an Intra-frame when ever a scene-change occurs.

A problem with this simplistic scene-change based error concealment mode decision method is that it contains an assumption that is not extremely accurate. For example, not all scene changes will be handled with an intra-frame. Furthermore, digital video encoders generally intentionally generate intra-frames on a periodic basis even when there is no scene-change. Intra-frames are periodically inserted for the purposes of random access and error recovery. The fact that not all scene-changes are marked with intra-frames and not all intra-frames are scene-changes makes this very simplistic frame type based scene-change error concealment mode decision method sub optimal.

A slightly more sophisticated and effective scene-change detection method detects scene-change by analyzing types of macroblocks used to represent a digital video frame. In such a scene-change detection method, a frame is determined to be a 'scene-change' frame if a large number of the macroblocks in the digital video frame are intra-coded. One implementation of this error concealment mode decision may be expressed with the following equation:

$$Do \begin{cases} SEC, & \text{if } \frac{N_{intra,rcv}}{N_{total,rcv}} \geq THD \\ TEC, & \text{if } \frac{N_{intra,rcv}}{N_{total,rcv}} < THD \end{cases} \quad (1)$$

wherein $N_{intra,rcv}$=the number of non-corrupt intra-macroblocks (in a frame) received $N_{total,rcv}$=the total number of non-corrupt macroblocks (in a frame) received; and THD=the threshold amount.

Note that $N_{total,rcv}$ may not be the total number of macroblocks in the frame because some macroblocks are missing or corrupt due to packet loss or channel errors.

The scene-change error concealment mode decision method of equation (1) is an improvement over the simplistic frame-type decision method. However, the error concealment mode decision method of equation (1) still has several problems. Four problems with the error concealment mode decision method of equation (1) are presented in the following table.

TABLE 1

| Problems with Error Concealment Mode Decision of Equation 1 | |
|---|---|
| Problem 1. | Using the macroblock type as the only indication for scene-change may not be accurate enough. The macroblock type is determined by the digital video encoder. Since each different digital video encoder has a different design, one cannot assume that the digital video encoder will act as expected. For example, a digital video encoder may code many macroblocks as "inter" although the residual error after motion compensation is significant. Thus, inter blocks may have been used even when a scene-change has occurred. |
| Problem 2. | Since some important information (including the header containing macroblock type) may be corrupt or lost, the remaining information may not be sufficient to make a reliable decision. For example, if 97% of macroblocks in a frame are lost and the few remaining macroblocks are all intra-coded then the error concealment mode decision method of equation 1) will conclude that the frame represents (a scene-change such that SEC is chosen. However, the macroblock types of the many lost macroblocks are unknown. It is possible that most of the lost macroblocks were inter-coded such that TEC should have been used. |
| Problem 3. | Motion is a factor that should be taken into more detailed consideration when making an error concealment mode decision. TEC has a better performance when concealing corrupt static scene frames than frames with very high motion. The simple scene-change detection doesn't take motion into consideration. |
| Problem 4. | The error concealment mode decision method specified in equation (1) does not work well for Intra-frames. Specifically, when all the macroblocks in an Intra-frame are intra-coded, the error concealment mode decision method of equation (1) will always choose SEC for intra-frames. Since Intra-frames are periodically inserted whether or not a scene-change has actually occurred, SEC will be used even though TEC may have provided better results. |

An Improved Scene-Change Detector for Error Concealment Mode Decisions

To provide better results in a digital video receiver/decoder, the present invention introduces a sophisticated scene-change detection system that may be used for making error concealment mode decisions. The scene-change detection system of the present invention addresses all of the issues presented in Table 1.

Problem 1: Inter-Frames With Large Residual Errors

To address the first problem in Table 1, a factor to reflect the impact of residual errors on inter macroblocks may be added into equation (1). In this manner, a frame with large residual errors from inter-frame encoding may be determined to be a scene-change. In one embodiment, the error concealment mode decision method of equation (1) is modified to become:

$$Do\begin{cases} SEC, & \text{if } k_1 * \frac{N_{intra,rcv}}{N_{total,rcv}} + Q_P * \text{Bits} \geq T \\ TEC, & \text{if } k_1 * \frac{N_{intra,rcv}}{N_{total,rcv}} + Q_P * \text{Bits} < T \end{cases} \quad (2)$$

wherein
$k_1$=a weighting factor for the first term (the % of inter-macroblocks)
$Q_p$=the average quantization parameters of the frame
Bits=the number of bits in the corrupt video frame; and
T=a threshold value.

In the revised error concealment mode decision method of equation (2), the added $Q_p$*Bits adds in the factor of residual errors on inter macroblocks. The idea behind this change is that the residual error for an inter macroblock in a scene-change frame is usually pretty large since the macroblock cannot find a good match from an earlier reference frame. Thus, more bits will be needed in order to encode the residual errors.

In communication networks, digital video information is usually segmented into and transmitted by small packets (or cells). The digital video packets may be lost during transmission or discarded by the digital video receiver/decoder due to a CRC (or checksum) failure. Therefore, the digital video receiver/decoder may not be able to get the corrupt data such that the "Bits" term (the number of the bits in the corrupt frame) in equation (2) may be unknown by the digital video decoder. To handle this, the "Bits" term may be divided into two parts: the number of bits the receiver/decoder receives (denoted as $Bits_{recv}$) and the number of bits that were lost (denoted as $Bits_{lost}$). With this change, equation (2) is modified into:

$$Do\begin{cases} SEC, & \text{if } k_1 * \frac{N_{intra,rcv}}{N_{total,rcv}} + Q_P * (Bits_{recv} + Bits_{lost}) \geq T \\ TEC, & \text{if } k_1 * \frac{N_{intra,rcv}}{N_{total,rcv}} + Q_P * (Bits_{recv} + Bits_{lost}) < T \end{cases} \quad (3)$$

A digital video decoder is generally not informed amount the number of bits that are lost during transmission. Since the digital video decoder does not know the amount of lost data, the $Bits_{lost}$ term should be estimated and provided by the lower layer (e.g. RTP). In one embodiment, the $Bits_{lost}$ term can be estimated using the following equation:

$$Bits_{lost} = P_{lost} \times S_{lost} \quad (4)$$

wherein
$P_{lost}$=the number of lost packets; and
$S_{lost}$=the estimated size of those lost packets.
The $P_{lost}$ term can be derived from the sequence numbers in packet headers. The $S_{lost}$ term can be estimated using the average payload size of earlier received digital video packets.

Placing equation (4) into equation (3) changes the error concealment mode decision equation into:

$$Do\begin{cases} SEC, & \text{if } k_1 * \frac{N_{intra,rcv}}{N_{total,rcv}} + Q_P * (Bits_{recv} + P_{lost} \times S_{lost}) \geq T \\ TEC, & \text{if } k_1 * \frac{N_{intra,rcv}}{N_{total,rcv}} + Q_P * (Bits_{recv} + P_{lost} \times S_{lost}) < T \end{cases} \quad (5)$$

Problem 2: Excessive Data Loss

Referring back to Table 1, the second problem with equation (1) is the inaccuracy of the equation if a large amount of digital video information is corrupt or otherwise unavailable. This second problem can be resolved by adding a scaling "error factor" to the left hand side of equation that biases the error concealment mode decision method toward temporal error concealment if a large amount of digital video information is not available. One implementation of adding a scaling factor to equation (5) is presented below:

$$Do\begin{cases} SEC, & \text{if } \left(1 - S\left(\frac{N_{corrupt}}{N_{total}}\right)\right)\left(k_1 * \frac{N_{intra,rcv}}{N_{total,rcv}} + Q_P * (Bits_{recv} + P_{lost} \times S_{lost})\right) \geq T \\ TEC, & \text{if } \left(1 - S\left(\frac{N_{corrupt}}{N_{total}}\right)\right)\left(k_1 * \frac{N_{intra,rcv}}{N_{total,rcv}} + Q_P * (Bits_{recv} + P_{lost} \times S_{lost})\right) < T \end{cases} \quad (6)$$

wherein
$N_{corrupt}$=the number of corrupt (including lost) macroblocks in a video frame;
$N_{total}$=the total number of macroblocks in the video frame; and
S( )=a bias function.

The bias function S(.) should satisfy S(0)=0 and S(1)=1. In one embodiment, the S(.) function in equation (6) is a non-linear bias function to give different scaling for different corruption rates. Because the number of scene-change frames is generally much less than the number of non-scene-change frames, the mode decision is designed to have a bias in favor of temporal error correction (TEC) as the number of corrupt macroblocks increases. Furthermore, spatial error correction (SEC) cannot perform well when most of macroblocks in a digital video frame are corrupt. In the extreme case, $N_{corrupt}=N_{total}$, the left hand side of the equation (6) is equal to 0, and temporal error correction (TEC) is always picked.

There are different ways to calculate the number of corrupt macroblocks within a video frame. The methods will differ depending on whether the digital video decoder receives the location of errors within a slice from a lower layer or not. Each of these two situations is set forth below.

Figure 2:
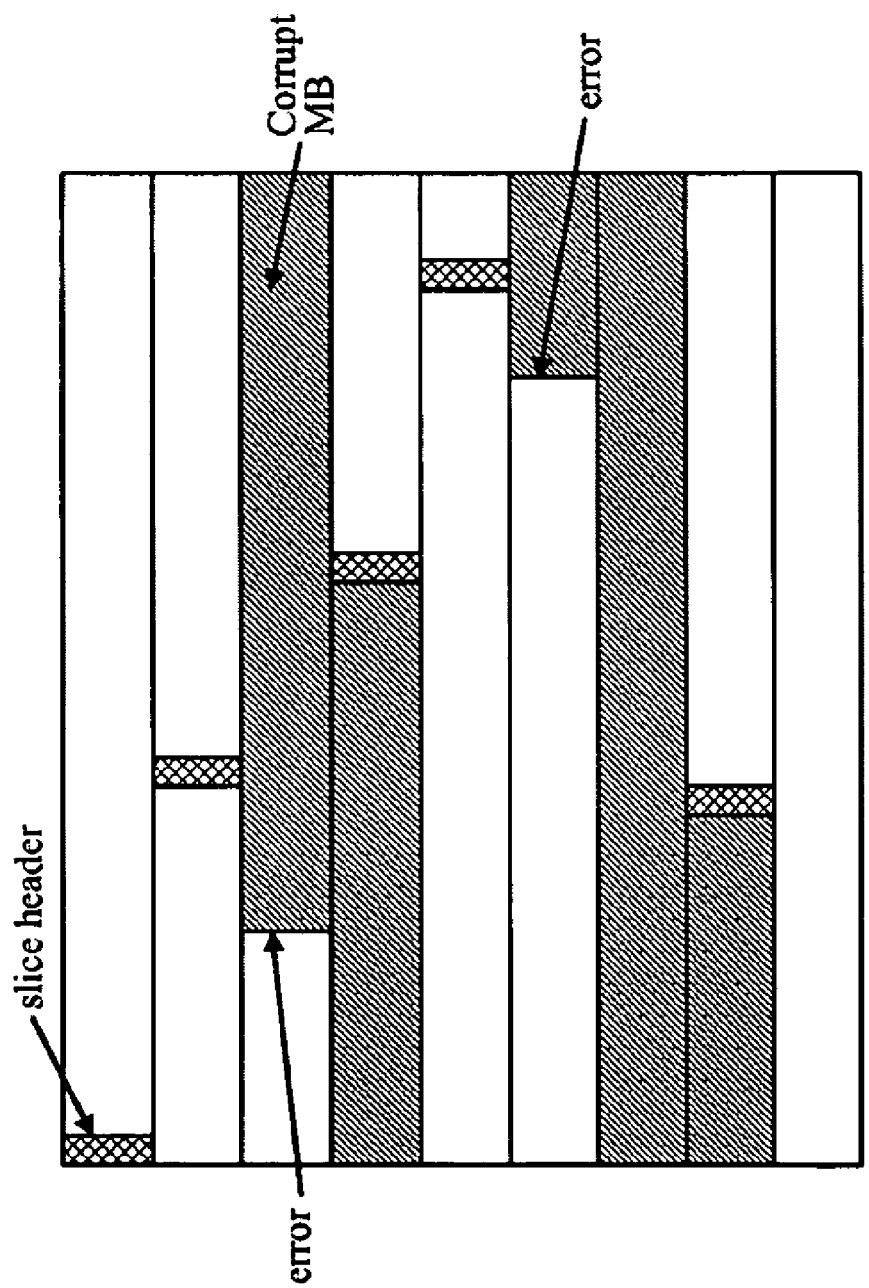
FIG. 2 illustrates an example of a digital video frame macroblock map wherein shaded areas represent corrupted macroblocks after an error that has been detected.

If a digital video decoder is informed as where the errors in the video frame are, an error macroblock map is created such that a macroblock is marked as "non-corrupt" if no error is found on that macroblock and all previous macroblocks until previous start code or resync marker. Otherwise, if an error is found in the current macroblock or any earlier macroblock until the previous start code or resync marker, the macroblock is marked as "corrupt". After the marking, the macroblock map consists of error segments wherein each error segment contains a consecutive number of corrupt macroblocks. An example of a macroblock error map containing error segments is shown in FIG. 2 wherein shaded areas represent corrupted macroblocks. Note that the term "slice" represents an independent decodable data structure in a video frame. Examples include a "video packet" in the MPEG4 video coding method and a "slice" in the H.263 and AVC video coding methods. The first macroblock number in a slice can be obtained from slice header.

Figure 3:
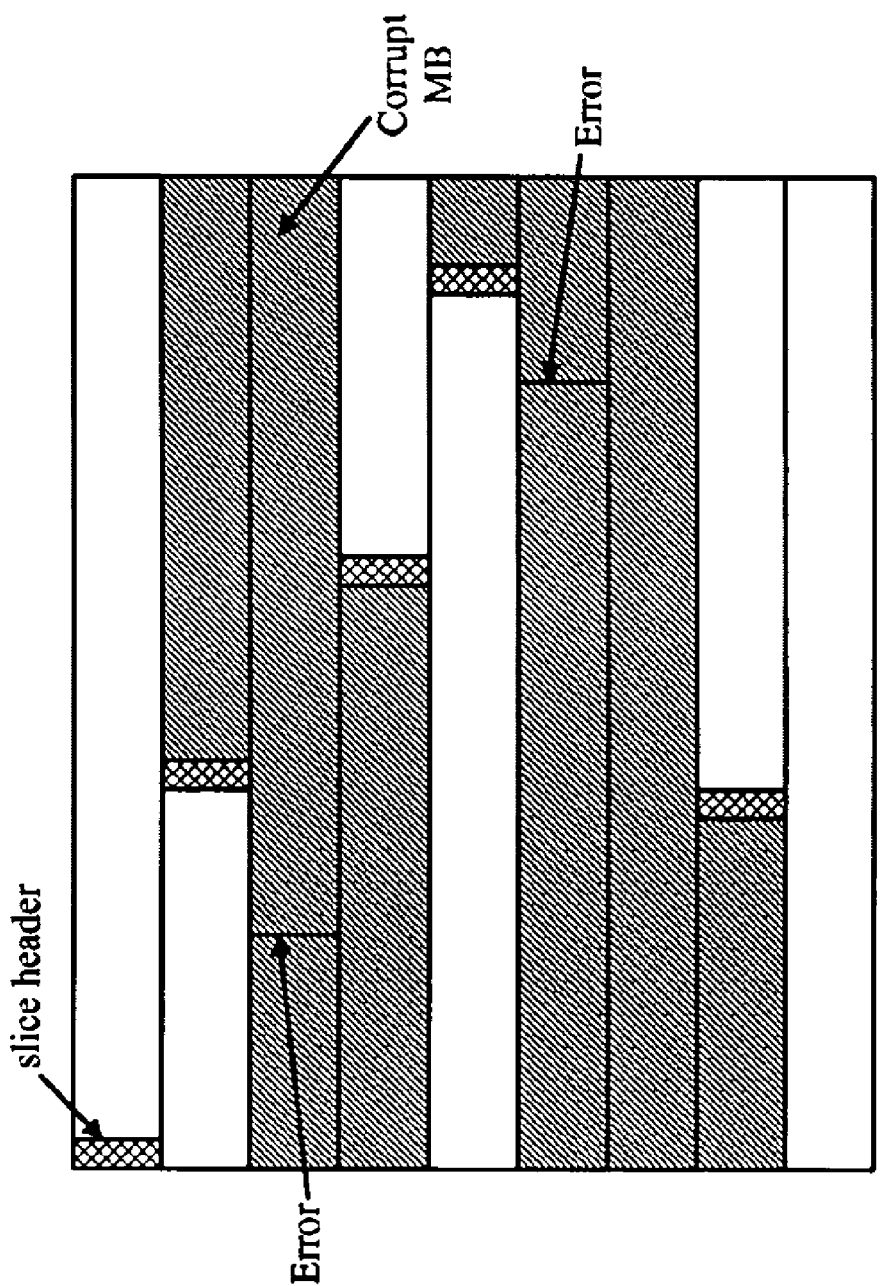
FIG. 3 illustrates an example of a digital video frame macroblock map wherein shaded areas represent corrupted macroblocks when an entire slice is deemed to be corrupt.

If the lower layer does not provide error location information to the digital video decoder, then the digital video decoder may attempt to detect errors by itself. Generally, such error detection is unreliable and may miss the very first corrupt macroblock. To prevent the problems caused by missing a corrupt macroblock, a conservative definition of a "non-corrupt macroblock" is used. A macroblock is marked as "non-corrupt" in the macroblock error map if no error is detected in the slice where the macroblock resides. Otherwise, if any error is detected in the slice then all macroblocks in that slice are marked as "corrupt". With this conservative definition of corrupt macroblocks, any detected error in a slice causes the entire slice to be useless. An example of this conservative error macroblock map and error segments in this case is illustrated in FIG. 3.

Problem 3: Motion Level Factor

Referring back to Table 1, the third problem with the scene-change detection system of equation (1) is that equation (1) fails to take into consideration heavy motion. Specifically, when there is a significant amount of motion, temporal error correction becomes less useful.

To address this problem, a "motion level" parameter may be added to the right end of equation (6). This newly added motion level parameter creates an added bias against using temporal error correction when there is heavy motion in a scene. An embodiment of an error concealment decision mode equation with a motion level parameter added to equation (6) is set forth below:

Note that the motion vectors for intra-macroblocks and lost macroblocks are not available. Simply assuming zero motion for the missing motion vectors is generally not appropriate. In one embodiment, the "latest available" motion vectors are used for corrupt and intra-coded macroblocks. The "latest available" motion vectors are obtained from "motion vector map" in which the motion information is updated for each incoming uncorrupt inter-macroblock. Specifically, the motion vector (MV) map consists of M×N entries (M and N are the number of blocks per column and per row respectively). Each entry contains the latest motion vectors $MV_x(i, j)$ and $MV_y(i, j)$ for a block. The motion vector map may be initialized with zeros and updated for every non-corrupt inter block that is received.

Problem 4: Intra-Frames

The fourth and final problem listed in Table 1 is that periodically inserted intra-frames may trick equation (1) into claiming that a scene-change has occurred when no scene-change has actually occurred. Specifically, an intra-frame that has been interjected into the stream of digital frames for $$Do\begin{cases} SEC, & \text{if } \left(1 - S\left(\frac{N_{corrupt}}{N_{total}}\right)\right)\left(k_1 * \frac{N_{intra,rcv}}{N_{total,rcv}} + Q_P * (Bits_{recv} + P_{lost} \times S_{lost}) + \left[\frac{\sum_{i,j}(|MV_x(i,j)| + |MV_y(i,j)|)}{k_2}\right]\right) \geq T \\ TEC, & \text{if } \left(1 - S\left(\frac{N_{corrupt}}{N_{total}}\right)\right)\left(k_1 * \frac{N_{intra,rcv}}{N_{total,rcv}} + Q_P * (Bits_{recv} + P_{lost} \times S_{lost}) + \left[\frac{\sum_{i,j}(|MV_x(i,j)| + |MV_y(i,j)|)}{k_2}\right]\right) < T \end{cases} \quad (7)$$

wherein $MV_x(i, j)$=the horizontal motion vectors of macroblock (i, j);

$MV_y(i, j)$=the vertical motion vectors of macroblock (i, j); and $k_2$=a scaling constant.

random access and error recovery may cause a digital video receiver/decoder to believe a scene-change has occurred. For resolving this fourth problem, a special scene-change decision method based on similarity instead of macroblock type information is designed only for use with I-frames. The bias cost in favor of TEC due to corruption is added into the decision metric. Similarly, the bias in favor of SEC for motion is also added. The following equation performs scene-change detection and includes a similarity term:

$$Do \begin{cases} SEC, & \text{if } S\left(\frac{N_{corrupt}}{N_{total}}\right)\left(SIM_Y + SIM_U + SIM_V - \left[\frac{\sum_{i,j}(|MV_x(i,j)| + |MX_y(i,j)|)}{C}\right]\right) < \tau \\ TEC, & \text{if } S\left(\frac{N_{corrupt}}{N_{total}}\right)\left(SIM_Y + SIM_U + SIM_V - \left[\frac{\sum_{i,j}(|MV_x(i,j)| + |MX_y(i,j)|)}{C}\right]\right) \geq \tau \end{cases} \quad (8)$$

wherein

C = a scaling constant for motion;

τ = the threshold;

$SIM_Y$ = a similarity metric for the luminance domain; and $SIM_U$ and $SIM_V$ = similarity metric for the two chrominance domains.

In one embodiment, the similarity metrics may be defined as $$SIM_Y = \frac{\vec{H}_{Y,m} \otimes \vec{H}_{Y,m-1}}{\|\vec{H}_{Y,m}\| \otimes \|\vec{H}_{Y,m-1}\|} \quad (9)$$

$$SIM_U = \frac{\vec{H}_{U,m} \otimes \vec{H}_{U,m-1}}{\|\vec{H}_{U,m}\| \otimes \|\vec{H}_{U,m-1}\|} \quad (10)$$

$$SIM_V = \frac{\vec{H}_{V,m} \otimes \vec{H}_{V,m-1}}{\|\vec{H}_{V,m}\| \otimes \|\vec{H}_{V,m-1}\|} \quad (11)$$

where $\vec{H}_{Y,m}$ and $\vec{H}_{Y,m-1}$ represent the luminance (Y) histogram for current and previously reconstructed frames. The symbols $\vec{H}_{U,m}$, $\vec{H}_{U,m-1}$, $\vec{H}_{V,m}$ and $\vec{H}_{V,m-1}$ for chrominance have similar definitions. In addition, '⊗' denotes the "inner product".

Figure 4:
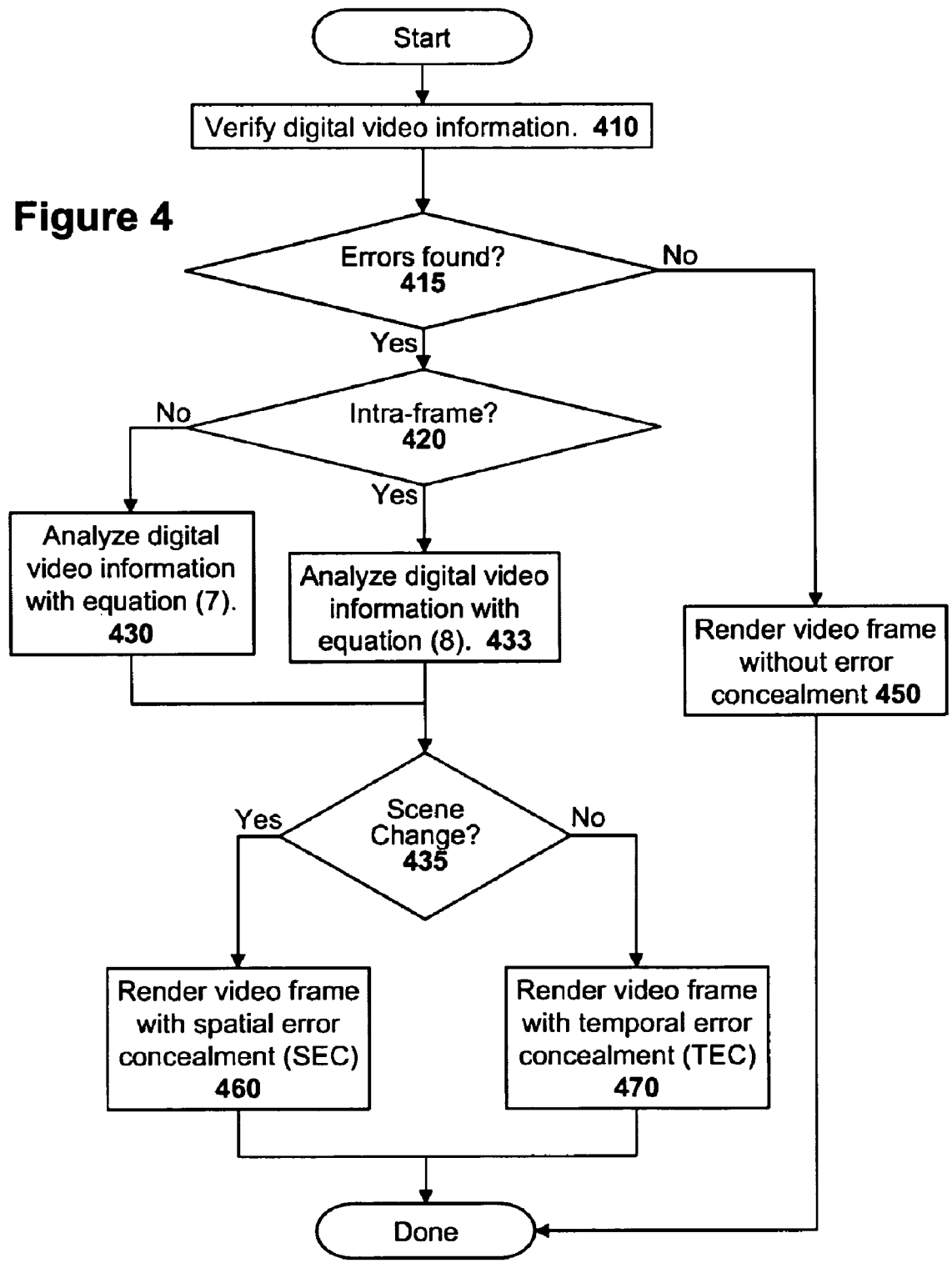
FIG. 4 illustrates a revised version of the flow chart of FIG. 1 wherein an improved scene-change based error concealment system is used.

FIG. 4 illustrates a revised version of the flow chart of FIG. 1 for performing scene-change detection for error concealment in a digital video decoder. In the flow diagram of FIG. 4, a decision step 420 has been added to determine if the digital video frame is an Intra-frame (I-frame). If the digital video frame is an Intra-frame then equation (8) will be used for scene-change detection as set forth in step 433. Otherwise, equation (7) will be used for scene-change detection as set forth in step 430.

Improved Spatial Error Concealment

The present invention introduces an improved Spatial Error Concealment (SEC) method for use when spatial error concealment is selected to conceal errors caused by missing or corrupt digital video information. The improved spatial error concealment method of the present invention comprises a nearest available pixel based median adaptive predictor with hierarchical interpolation.

The proposed spatial error concealment approach is a macroblock-based concealment method and assumes that all correctly received macroblocks have been decoded in advance. In one embodiment, the macroblocks are sixteen by sixteen (16×16) in the luminance domain and eight by eight (8×8) in the chrominance domain as set forth in the well-known ITU and MPEG standards. The spatial error concealment method is performed on damaged macroblocks in the standard raster order. Thus, all macroblocks and pixels to the left and above the macroblock to be concealed have already been produced by the decoder and are available for concealing the damaged macroblock.

The proposed spatial error concealment method divides damaged macroblocks into four different areas. The proposed spatial error concealment method then handles each of the different areas with a specific spatial error concealment scheme for that area of the macroblock. The four areas and the corresponding pixel coordinates for a 16×16 macroblock are defined as:

Area F (lower right corner, 1 pixel): (15, 15)

Area B (bottom row, 15 pixels): (i, 15), 0≦i≦14

Area R (rightmost column, 15 pixels): (15, j), 0≦j≦14

Area M (middle part, 225 pixels): (i, j), 0≦i, j≦14

Figure 5:
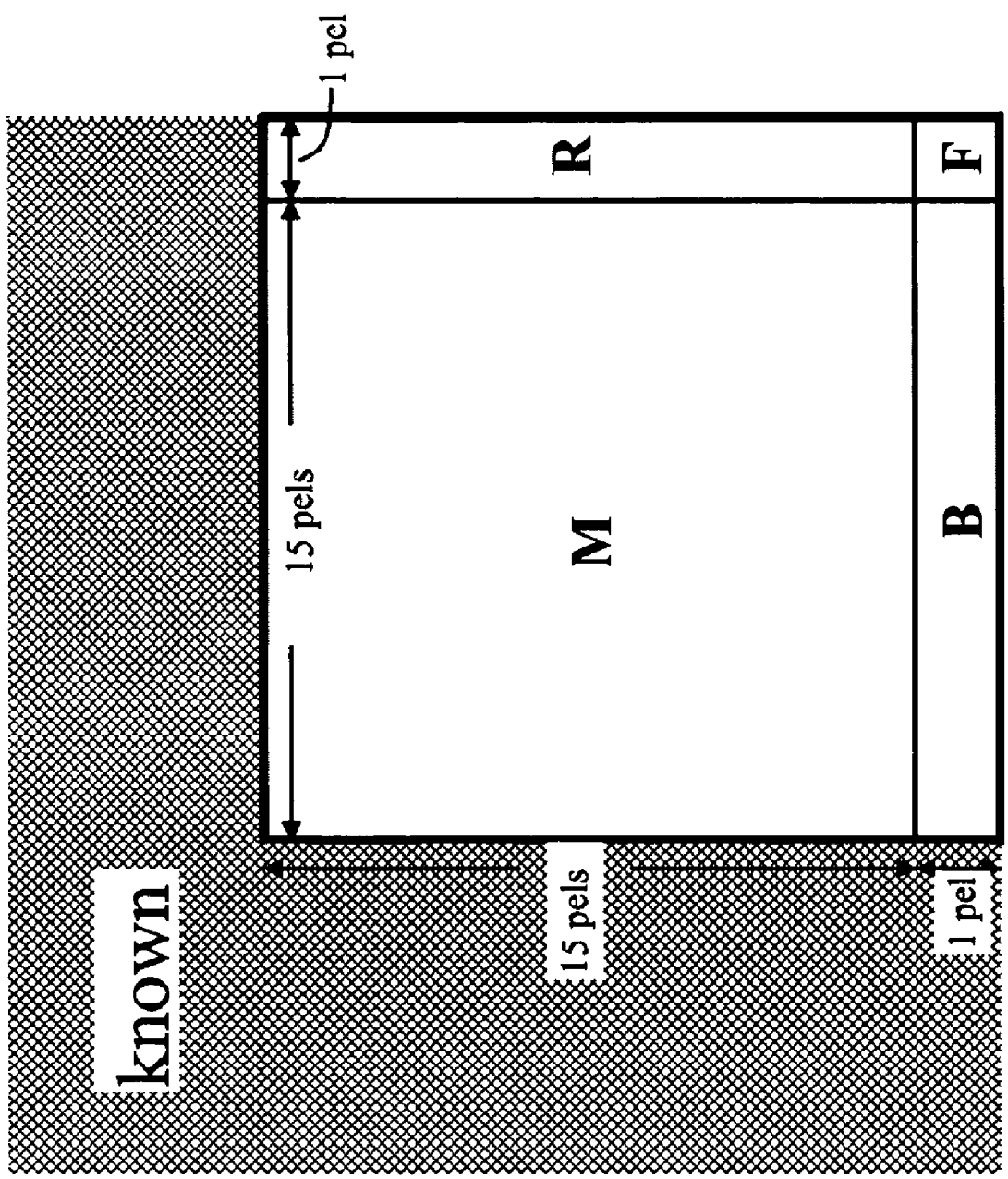
FIG. 5 graphically illustrates a macroblock segmented into different areas that are handled individually in an improved spatial error concealment method.

FIG. 5 graphically illustrates the segmentation of a macroblock into the four macroblock areas F, B, R, and M.

The proposed spatial error concealment method addresses the four different macroblock areas in the following order.

1. Reconstruction of area F (the lower right corners): x(15, 15).
2. Reconstruction of area B (the bottom row): x(i, 15), 0≦i≦14.
3. Reconstruction of area R (the rightmost column): x(15, j), 0≦j≦14.
4. Reconstruction of area M (the middle part): x(i, j), 0≦i, j≦14 wherein x(i, j) represents the reconstructed pixel value at pixel location(i, j). (Note that the reconstruction of area B and area R could be performed in reverse order with similar results.) The spatial error concealment methods for each of the four different areas are each described in the following four sections.

Reconstruction of Area F (the Lower Right Corner): x(15, 15))

The F area (the lower right corner) is reconstructed by processing the nearest "available" pixels with one of the following three methods: median adaptive prediction, pixel averaging, or pixel copying. A pixel is referred to as "available" if the pixel is located in a non-corrupt macroblock.

Depending on the distance to the nearest available pixels from area F, the reconstruction procedure falls into Case 1 or Case 2 as follows:

Case 1: Case 1 requires that at least one of the adjacent three pixels in three neighboring macroblocks (below, right, and lower right) be available. Specifically, referring to FIG. 6A, one of area F's three closest neighbors α, β and γ must be in a non-corrupt macroblocks. Case 1 is further divided into the following four sub-cases 1.1 to 1.4:

Case 1.1: Case 1.1 occurs when all of the three surrounding pixels α, β and γ are available (all of the pixels are in non-corrupt macroblocks). When three surrounding pixels α, β and γ are available, then the corner pixel of area F is reconstructed using the median adaptive predictor with:

$$x(15, 15) = \begin{cases} \min(x(16, 15), x(15, 16)) & \text{if } x(16, 16) \geq \max(x(16, 15), x(15, 16)) \\ \max(x(16, 15), x(15, 16)) & \text{if } x(16, 16) \leq \min(x(16, 15), x(15, 16)) \\ x(16, 15) + x(15, 16) - x(16, 16) & \text{otherwise} \end{cases} \quad (12)$$

Figure 6:
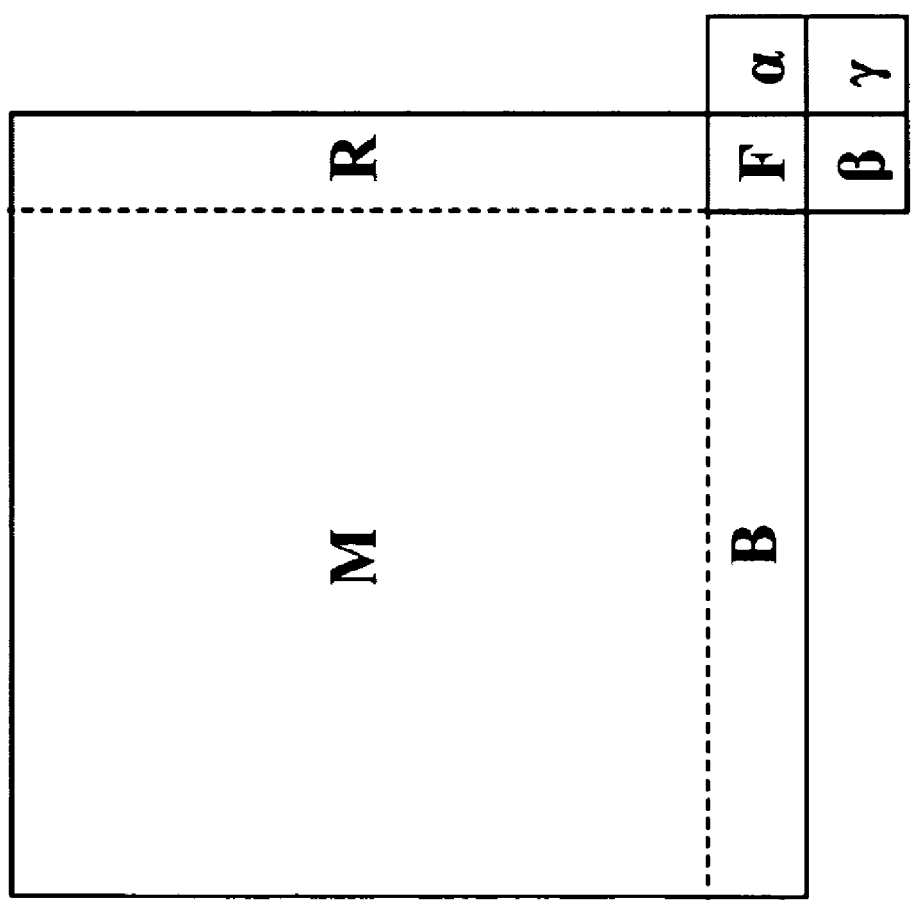
FIG. 6A illustrates the three closest neighboring pixels α, β and γ to area F in a macroblock.
FIG. 6B illustrates a pixel map for a median adaptive predictor.

The original median adaptive predictor, designed to compress images losslessly, is a nonlinear predictor to predict a current pixel x by three surrounding pixels p, q and r as illustrated in FIG. 6B. It assumes that a vertical edges lies above x if $r \geq q \geq p$ or $r \leq q \leq p$, and a horizontal edge lies above x if $r \geq p \geq q$ or $r \leq p \leq q$. Note that the three surrounding pixels used to reconstruct area F are different from those in the original median adaptive predictor.

Case 1.2: Case 1.2 is used when both pixels α and β of FIG. 6A are in non-corrupt macroblocks (but γ is not available since that would be case 1.1). In case 1.2, the corner pixel of area F is reconstructed using pixel averaging with the following equation:

$$x(15, 15) = \frac{(x(16, 15) + x(15, 16) + 1)}{2} \quad (13)$$

wherein the divide by two operation may be performed with a shift right operation (>>1).

Case 1.3: Case 1.3 is used when either α or β (but not both) is in a non-corrupt macroblock (the status of γ is irrelevant). In case 1.3, area F is reconstructed with pixel copying as:

$$x(15,15) = x(16,15) \text{ or } x(15,16) \quad (14)$$

Case 1.4: Finally, Case 1.4 is used when only γ is in a non-corrupt macroblock. In case 1.4, area F is reconstructed with pixel copying as:

$$x(15,15) = x(16,16) \quad (15)$$

Case 2: Referring back to FIG. 6A, Case 2 occurs when area F's three closest neighbors α, β and γ are all in corrupt macroblocks. Since α, β and γ of FIG. 6A are not available, area F must be reconstructed using pixels from the other three macroblocks (above, left and upper left) adjacent to the macroblock currently being concealed. Note that these macroblocks may not be available if the current macroblock is located on an edge. If the macroblock is not located on an edge, these macroblocks have already been reconstructed since they were received without error or already concealed as illustrated in FIG. 5. In case 2, the bottom-rightmost pixel of the neighboring macroblocks will be used reconstruct area F as illustrated by pixels α, β and γ in FIG. 7. Due to the edge situations, case 2 is further divided into the following four sub-cases 2.1 to 2.4, Case 2.1: Case 2.1 occurs when macroblock is located in the upper left corner of a frame. In this case, no nearby pixel information was available so area F is just set to an average or median pixel value. In one embodiment, area F is reconstructed with the following equation:

$$x(15,15) = 128 \quad (16)$$

Case 2.2: Case 2.2 occurs when the macroblock is located in the top row of a frame. In Case 2.2, area F is reconstructed by pixel copying α in FIG. 7 with the following equation:

$$x(15,15) = x(-1,15) \quad (17)$$

Case 2.3: Case 2.3 occurs when the macroblock is located in the leftmost column of the frame. In case 2.3, area F is reconstructed by pixel copying β of FIG. 7 with the following equation:

$$x(15,15) = x(15,-1) \quad (18)$$

Figure 7:
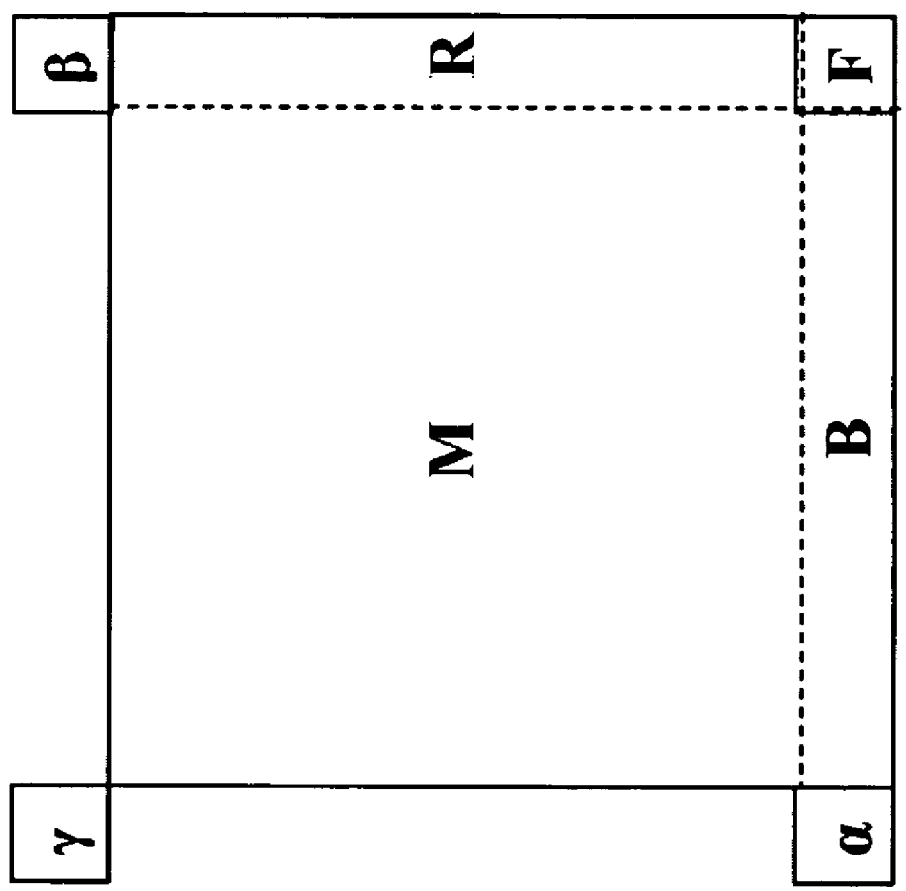
FIG. 7 illustrates the bottom-rightmost pixel of the neighboring macroblocks that are used in an improved spatial error concealment method.

Case 2-4: Case 2.1 occurs when none of the above cases apply (all of the upper and left macroblocks are available). In case 2.4, area F is reconstructed by applying the median adaptive predictor on x(−1, 15), x(15, −1), and x(−1, −1) (pixels α, β and γ as illustrated in FIG. 7) with the following equation:

$$x(15, 15) = \quad (19)$$
$$\begin{cases} \min(x(-1, 15), x(15, -1)) & \text{if } x(-1, -1) \geq \max(x(-1, 15), x(15, -1) \\ \max(x(-1, 15), x(15, -1)) & \text{if } x(-1, -1) \leq \min(x(-1, 15), x(15, -1) \\ x(-1, 15) + x(15, -1) - x(-1, -1) & \text{otherwise} \end{cases}$$

Reconstruction of Area B (the Bottom Row): x(i, 15), $0 \leq i \leq 14$

Referring back to FIG. 6A, two different reconstruction schemes are used to recover the bottom row area B. Specifically, Case 1 or Case 2 set forth below will be selected depending on whether the macroblock below row area B is available or corrupt or otherwise not available.

Case 1: Case 1 is used when the macroblock below row area B is non-corrupt. In this case, each pixel in the area B is reconstructed as the same value as the pixel below it using the following equation:

$$x(i,15) = x(i,16), \; 0 \leq i \leq 14 \quad (20)$$

Case 2: Case 2 is used when the macroblock below row area B is corrupt or not available. In this case, each of the pixels in the row area B is reconstructed as the average of two previously reconstructed pixels starting from the middle of the bottom row. The initial two previously reconstructed pixels are the pixel from area F and the bottom-rightmost pixel in the macroblock to the left. The reconstruction of the pixels is performed using the following equation:

$$x(i, 15) = \frac{(x(i-k, 15) + x(i+k, 15) + 1)}{2} \quad (21)$$

wherein the reconstruction order and the relationship between i and k are set forth in the following Table 2. Note that the divide-by-two operation can be performed with a shift right operation (>>1).

TABLE 2

Reconstruction order and the relationship between i and k for areas B & R

| Order | i | k |
|---|---|---|
| 1 | 7 | 8 |
| 2 | 3 | 4 |
| 3 | 11 | 4 |
| 4 | 1 | 2 |
| 5 | 5 | 2 |
| 6 | 9 | 2 |
| 7 | 13 | 2 |
| 8 | 0 | 1 |
| 9 | 2 | 1 |
| 10 | 4 | 1 |
| 11 | 6 | 1 |
| 12 | 8 | 1 |
| 13 | 10 | 1 |
| 14 | 12 | 1 |
| 15 | 14 | 1 |

Figure 8A:
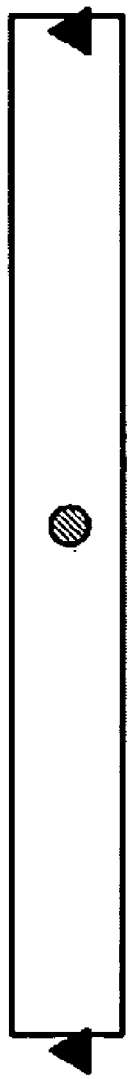
FIGS. 8A, 8B, and 8C illustrate how an improved spatial error concealment method reconstructs a bottom row of pixels in a corrupt macroblock.
Figure 8B:
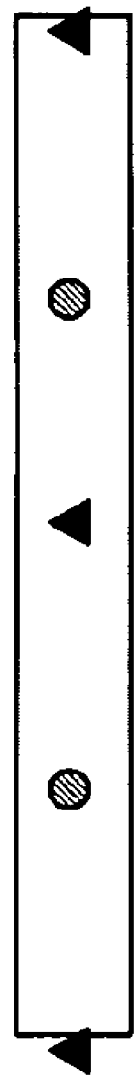
Figure 8C:
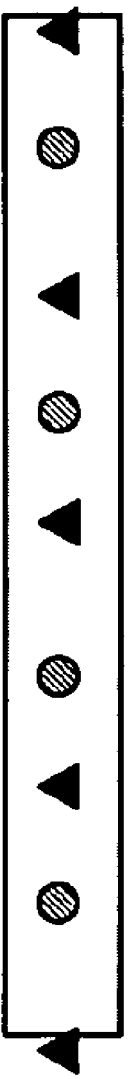

The reconstruction procedure is graphically illustrated in FIGS. 8A to 8C. Each pixel in the bottom row, x(i, 15), is reconstructed by the average of the two closest previous reconstructed pixels. Each pixel requires two add operations (+) and one shift operation (>>) for the reconstruction.

Reconstruction of R (the Rightmost Column): x(15, i), $0 \leq i \leq 14$

The reconstruction of the rightmost column R area in FIG. 6A proceeds in the same manner as the reconstruction procedure for the bottom row area B. Specifically, two different schemes are used to conceal the rightmost column R area of a damaged macroblock depending on whether or not the macroblock to the right of column area R is corrupt.

Case 1: Case 1 is used when the macroblock to the right of the column area R is non-corrupt. In this case, each pixel in the area R is reconstructed the same value as the pixel next to it with the following equation:

$$x(15,i) = x(16,i), \quad 0 \leq i \leq 14 \quad (22)$$

Case 2: Case 2 is used when the macroblock to the right of the column area R is corrupt or not available. In case 2, each pixel in the area R is reconstructed as the average of two previously reconstructed pixels starting from the middle of the rightmost column with the following equation:

$$x(15, i) = \frac{(x(15, i-k) + x(15, i+k) + 1)}{2} \quad (23)$$

The reconstruction order and the relationship between i and k are the same as those in the previous section on reconstruction row area B. Note that the divide-by-two operation can be performed with a shift right operation (>>1).

Reconstruction of Area M (the Middle Part): x(i, j), $0 \leq i$, $i \leq 14$

At this point, the pixels in the bottom row and the rightmost column of the macroblock have been reconstructed. The remaining pixels (the middle part of the macroblock, area M as illustrated in FIG. 6A) are reconstructed as the average of four previously reproduced pixels starting from the middle of the macroblock. Specifically, the following equation can be used to fill in the pixels of area M:

$$x(i, j) = \frac{(x(i-m, j-n) + x(i+m, j+n) + x(i+n, j-m) + x(i-n, j+m) + 2)}{4} \quad (24)$$

wherein n=0 or m. Note that the division by four in equation (24) can be performed with a right shift two places operation (>>2). The reconstruction order and the relationship between (i, j), m and n for the first 25 pixels are shown in Table 3. The order of the remaining pixels can be derived accordingly.

TABLE 3

Reconstruction order and the relationship between i and k for area M.

| order | (i, j) | m | n |
|---|---|---|---|
| 1 | (7, 7) | 8 | 0 |
| 2 | (3, 3) | 4 | 4 |
| 3 | (11, 3) | 4 | 4 |
| 4 | (3, 11) | 4 | 4 |
| 5 | (11, 11) | 4 | 4 |
| 6 | (7, 3) | 4 | 0 |
| 7 | (3, 7) | 4 | 0 |
| 8 | (11, 7) | 4 | 0 |
| 9 | (7, 11) | 4 | 0 |
| 10 | (1, 1) | 2 | 2 |
| 11 | (5, 1) | 2 | 2 |
| 12 | (9, 1) | 2 | 2 |
| 13 | (13, 1) | 2 | 2 |
| 14 | (1, 5) | 2 | 2 |
| 15 | (5, 5) | 2 | 2 |
| 16 | (9, 5) | 2 | 2 |
| 17 | (13, 5) | 2 | 2 |
| 18 | (1, 9) | 2 | 2 |
| 19 | (5, 9) | 2 | 2 |
| 20 | (9, 9) | 2 | 2 |
| 21 | (13, 9) | 2 | 2 |
| 22 | (1, 13) | 2 | 2 |
| 23 | (5, 13) | 2 | 2 |
| 24 | (9, 13) | 2 | 2 |
| 25 | (13, 13) | 2 | 2 |
| etc. | | | |

Figure 9A:
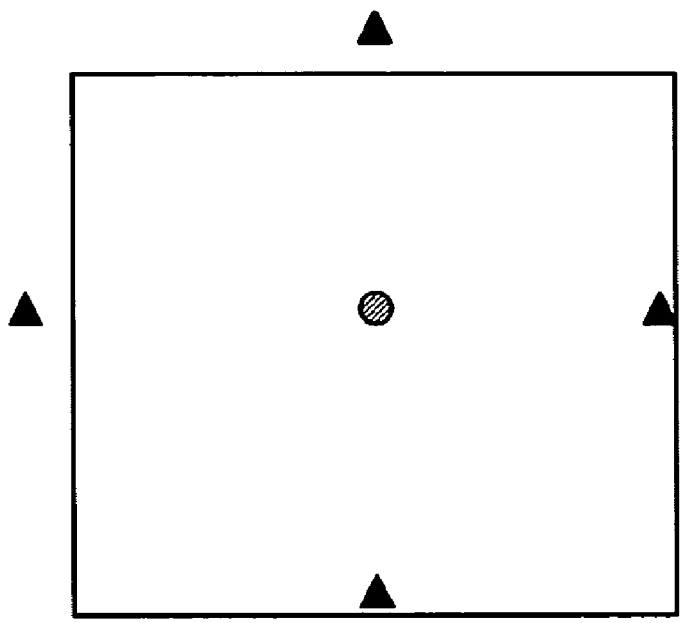
FIGS. 9A and 9B illustrate how an improved spatial error concealment method reconstructs a central area of pixels in a corrupt macroblock.
Figure 9B:
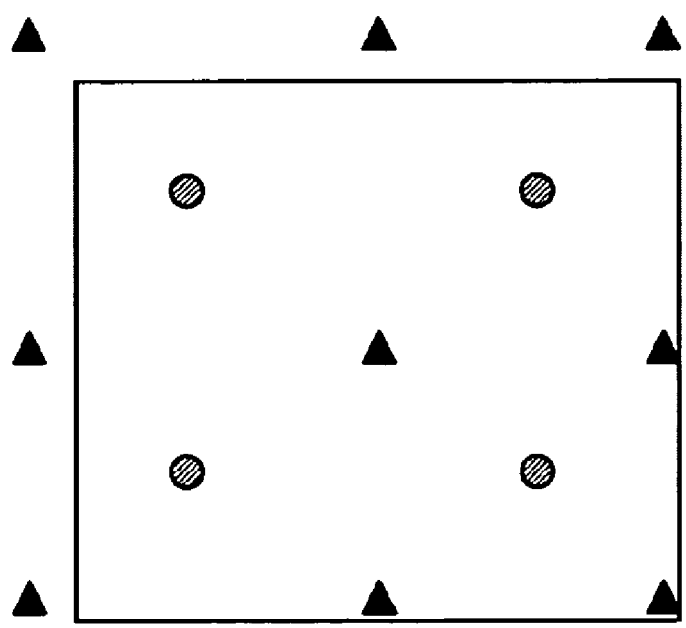

Each pixel reconstruction takes four add operations (+) and one shift right two places (>>2) operation. The reconstruction procedure for Area M is graphically illustrated in FIGS. 9A and 9B.

Errors Propagated to Uncorrupted Frames

Even when the information for a digital video frame is transmitted and received without any error, the displayed digital video frame may be visually degraded due to errors in earlier received digital video frames. Specifically, a current digital video frame may contain references to corrupted macroblocks in earlier transmitted digital video frames. If those corrupted macroblocks were reconstructed with an error concealment method, the current digital video frame that references those reconstructed macroblocks will contain visual artifacts.

To address this problem, the present invention proposes "refreshing" macroblocks under certain conditions. The term "refreshing" means reproducing macroblocks by spatial error concealment (SEC). To prevent over-shooting (e.g. blurring) introduced by the SEC, the "refreshing" scheme is only applied on the chrominance (U and V) domain.

The refreshing procedure of the present invention includes the following three steps: preparation, decision and processing. Each step will be described in detail.

Preparation: A Refreshing Table

The system creates a refreshing table consisting of M×N entries wherein each entry represents the "refreshing" status for a macroblock (M and N denote the number of rows and columns of macroblocks in a digital frame). The system sets the initial value of an entry as '2' if the corresponding macroblock is corrupt and concealed by spatial error correction. Otherwise, set the initial value as '0'.

Decision: Use Spatial Error Concealment for Non Corrupt Block?

Next, the system scans the digital video frame and changes the refreshing table entry value from '0' to '1' if the corresponding macroblock satisfies all the following conditions:
1. It is a non corrupt macroblock (If the macroblock is corrupt then error concealment will be triggered.)
2. It is an inter-macroblock (intra macroblocks have no error propagation problem)
3. The number of non-corrupt macroblocks is greater than a threshold. (SEC cannot perform well in the condition of too many corrupt macroblocks.)

Otherwise, the system leaves the value as it is.

Because the purpose of the proposed algorithm is to reduce the impact of error propagation on non corrupt inter-macroblocks, the decision should be made based on the error conditions. Accordingly, the threshold in condition 3 should be set as a function of damage. The threshold should be set lower such that more macroblocks will be refreshed when damage is more significant. To reflect the true impact, the damage is calculated not only by the number of corrupt macroblocks, but also by the other factors, such as the amount of motion, whether a scene-change occurred, non-corrupt intra-macroblocks, past damage, etc. Factors such as large amounts of motion and a scene-change occurring tend to make the damage even worse. On the other hand, non-corrupt intra-macroblocks tend to reduce the damage. In one embodiment, the damage factor is calculated with the following equation:

$$D_i = k_1(|MV_X|+|MV_Y|) \times (sN_i + k_2(|MV_X|+|MV_Y|)ID_{i-1})$$

wherein:
$|MV_X|+|MV_Y|$=motion vector magnitude
$N_i$=new damage (number of corrupt macroblocks)
$D_{i-1}$=past damage
$k_1$, $k_2$=constants to reflect damage expansion caused by motion ($k_1, k_2 \geq 1$). $k_1=k_2=1$ for static scene.
I=error correction factor (a benefit gained from non-corrupt Intra-macroblocks). $I \leq 1$ (1 indicating no non-corrupt Intra-macroblocks)
s=scene-change factor, s>1 (1 indicating no scene-change occurred)

Processing: Perform the Spatial Error Concealment

Apply the spatial error concealment method on the chrominance domain for a macroblock whose corresponding refreshing table entry is marked as '1'. Apply the spatial error concealment algorithm on both the luminance domain and chrominance domain for each macroblock marked as '2'. Many different spatial error concealment methods may be used. In one embodiment, the spatial error concealment method based set forth in the previous section serves as spatial error concealment for "refreshing" in the experiment.

The foregoing has described a number of techniques for performing error concealment in digital video. It is contemplated that changes and modifications may be made by one of ordinary skill in the art, to the materials and arrangements of elements of the present invention without departing from the scope of the invention.

We claim:

1. A method of determining if a digital video frame represents a scene-change in a digital video stream, said method comprising:
   determining if said digital video frame is an intra-frame, and applying using a first equation comprising a similarity metric to determine if a scene-change occurred if said digital video frame is an intra-frame;
   applying a second equation comprising an intra-macroblock ratio term and a frame bit size term to determine if a scene-change occurred if said digital video frame is not an intra-frame, said intra-macroblock ratio term comparing a number of intra-macroblocks for said digital video frame to a total number of macroblocks for said digital video frame, said frame bit size term based on a quantization parameter and a number of bits for said digital video frame, said number of bits for said digital video frame based on a number of bits received for said digital video frame, a number of packets lost, and an average packet size.

2. The method of determining if a digital video frame represents a scene-change in a digital video stream as set forth in claim 1, wherein said frame bit size term is based on a product of the quantization parameter multiplied by the number of bits for said digital video frame.

3. The method of determining if a digital video frame represents a scene-change in a digital video stream as set forth in claim 2, wherein said number of bits for said frame is based on a resulting value of the number of bits received for said digital video frame plus the number of packets lost multiplied by the average packet size.

4. The method of determining if a digital video frame represents a scene-change in a digital video stream as set forth in claim 1 wherein said second equation further comprises a motion level term that specifies an amount of motion.

5. The method of determining if a digital video frame represents a scene-change in a digital video stream as set forth in claim 1 wherein said second equation further comprises a data loss scaling factor.

6. The method of determining if a digital video frame represents a scene-change in a digital video stream as set forth in claim 5 wherein said data loss scaling factor biases towards temporal error concealment.

7. The method of claim 1, wherein the similarity metric includes a chrominance domain metric.

8. A method of determining if a digital video frame represents a scene-change in a digital video stream, said method comprising:
   resolving a multi-term equation comprising an intra-macroblock ratio term and a frame size term, said intra-macroblock ratio term comparing a number of intra-macroblocks for said digital video frame to a total number of macroblocks for said digital video frame, said frame bit size term based on a quantization parameter and a number of bits for said digital video frame, said number of bits for said digital video frame based on a number of bits received for said digital video frame, a number of packets lost, and an average packet size; and
   determining if a scene change occurred based on a comparison of a threshold value with the resolved multi-term equation.

9. The method of determining if a digital video frame represents a scene-change in a digital video stream as set forth in claim 8 wherein said frame size term is based on a product of the quantization parameter multiplied by the number of bits for said digital video frame.

10. The method of determining if a digital video frame represents a scene-change in a digital video stream as set forth in claim 9 wherein said number of bits for said frame is based on a resulting value of the number of bits received for said digital video frame plus the number of packets lost multiplied by the average packet size.

11. The method of determining if a digital video frame represents a scene-change in a digital video stream as set forth in claim 8 wherein said multi-term equation further comprises a motion level term that specifies an amount of motion.

12. The method of determining if a digital video frame represents a scene-change in a digital video stream as set forth in claim 8 wherein said multi-term equation further comprises a data loss scaling factor.

13. The method of determining if a digital video frame represents a scene-change in a digital video stream as set forth in claim 12 wherein said data loss scaling factor biases towards temporal error concealment.

14. A non-transitory computer readable medium, said computer readable medium comprising a series of instructions for determining if a digital video frame represents a scene-change in a digital video stream, said series of instructions implementing the steps of:

resolving a multi-term equation comprising an intra-macroblock ratio term and a frame size term, said intra-macroblock ratio term comparing a number of intra-macroblocks for said digital video frame to a total number of macroblocks for said digital video frame, said frame bit size term based on a quantization parameter and a number of bits for said digital video frame, said number of bits for said digital video frame based on a number of bits received for said digital video frame, a number of packets lost, and an average packet size; and determining if a scene change occurred based on a comparison of a threshold value with the resolved multi-term equation.

15. The computer readable medium as set forth in claim 14 wherein said frame size term is based on a product of the quantization parameter multiplied by the number of bits for said digital video frame.

16. The computer readable medium as set forth in claim 15 wherein said number of bits for said frame is based on a resulting value of the number of bits received for said digital video frame plus the number of packets lost multiplied by the average packet size.

17. The computer readable medium as set forth in claim 14 wherein said multi-term equation further comprises a motion level term that specifies an amount of motion.

18. The computer readable medium as set forth in claim 14 wherein said multi-term equation further comprises a data loss scaling factor.

19. The computer readable medium as set forth in claim 18 wherein said data loss scaling factor biases towards temporal error concealment.

* * * * *